US005710721A

United States Patent [19]

Rieckhoff et al.

[11] Patent Number: 5,710,721

[45] Date of Patent: Jan. 20, 1998

[54] INTERNAL POSTAGE METER MACHINE INTERFACE CIRCUIT

[75] Inventors: Peter Rieckhoff; Michael Sperling, both of Berlin, Germany

[73] Assignee: Francotyp-Postalia AG & Co., Birkenwerder, Germany

[21] Appl. No.: 568,019

[22] Filed: Dec. 6, 1995

[30] Foreign Application Priority Data

Dec. 7, 1994 [DE] Germany .......................... 44 45 053.2

[51] Int. Cl.[6] .............................. G06F 13/10; G06F 3/06; G07B 17/00; H04L 12/02

[52] U.S. Cl. .................................. 364/514 R; 364/514 B; 364/550; 395/200.07; 395/200.14; 395/309; 395/310

[58] Field of Search ............................ 364/514 R, 514 B, 364/550; 395/200.07, 200.14, 309, 310

[56] References Cited

U.S. PATENT DOCUMENTS

| | | | |
|---|---|---|---|
| 4,746,234 | 5/1988 | Harry | 400/120.01 |
| 4,866,421 | 9/1989 | Szczepanek | 340/825.52 |
| 5,199,105 | 3/1993 | Michael | 395/842 |
| 5,267,172 | 11/1993 | Vermesse | 364/464.02 |
| 5,283,744 | 2/1994 | Abumehdi et al. | 364/464.02 |
| 5,374,926 | 12/1994 | Szczepanek | 340/825.52 |
| 5,455,700 | 10/1995 | Thompson et al. | 359/135 |

FOREIGN PATENT DOCUMENTS

| | | |
|---|---|---|
| 0 231 452 | 8/1987 | European Pat. Off. . |
| 38 33 746 | 4/1990 | Germany . |

*Primary Examiner*—Edward R. Cosimano

*Attorney, Agent, or Firm*—Hill, Steadman & Simpson

[57] ABSTRACT

An internal postage meter machine interface circuit is equipped with transmission and reception registers for storing data transmitted parallel and with a shift register for serial-to-parallel or parallel-to-serial conversion of transmitted data within an actuator/sensor control. Data are communicated serially between the meter and a register unit in the base. Sensors and actuators of the base are connected to the register unit. Sensor signals are shifted into the shift register of the actuator/sensor controller and are present therein so as to be fetchable in parallel. A sensor status register group for parallel data of the sensor signals of at least one sensor is provided as a reception register. At least one sensor status register and at least one interrupt control register are connected to a watchdog circuit in order to monitor the received bits of the sensor signals for status change in order to trigger an interrupt to the control unit, as warranted.

24 Claims, 4 Drawing Sheets

FIG.2
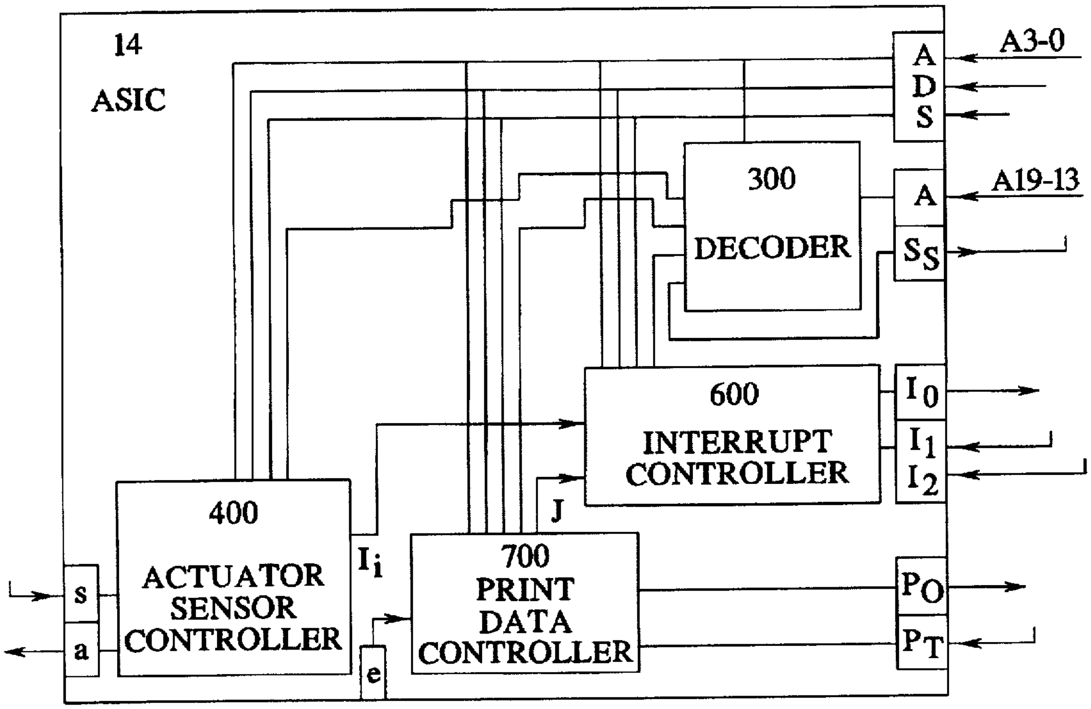
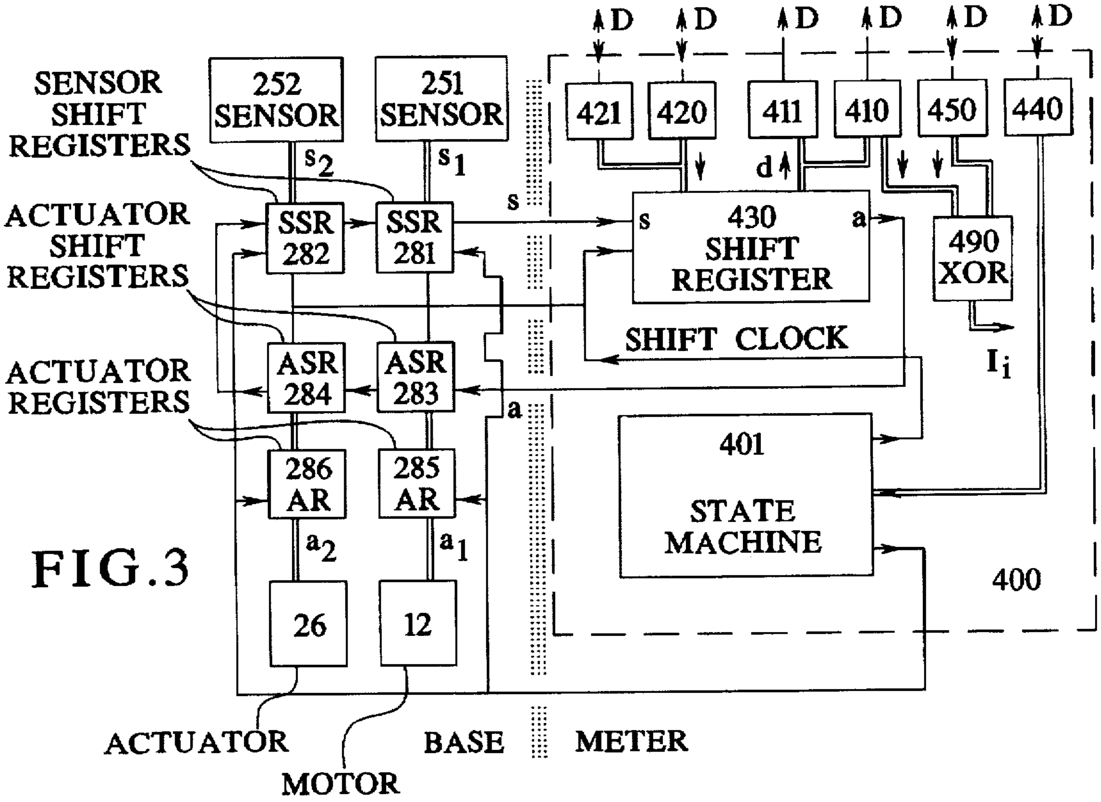
FIG.3

INTERNAL POSTAGE METER MACHINE INTERFACE CIRCUIT

BACKGROUND OF THE INVENTION

1. Field of the Invention

The present invention is directed to an internal postage meter machine interface circuit of the type having transmission and reception registers for storing data transmitted in parallel and having a shift register for serial-to-parallel or parallel-to-serial conversion of the transmitted data.

2. Description of the Prior Art

A standard postage meter machine basically includes a tape or ribbon transport means, an input unit, a display and a printer control unit for a printer device that prints printing patterns on a recording medium that is to be printed and is moved to this printer device. Such printer devices, particularly for an electro-thermal printing with an inked ribbon, and conveyor devices are equipped with actuators and sensors that are driven or interrogated via a circuit arrangement (U.S. Pat. No. 4,746,234).

Sensors that detect the conveying of the recording medium, for example, trigger the printing event. Other sensors determine the position of the platen or monitor the ongoing printing process.

A shaft of the conveyor or a reel of an inking medium moved relative to the recording medium that transfers the inking particles is coupled to an encoder that makes clock signals available for the printer controller during the printing process. All sensors or actuators are directly or indirectly connected to the control unit, which may be a microprocessor control unit, via a special circuit arrangement.

German OS 38 33 746 discloses a switch unit for a printer head in a thermal transfer printing method operated by a control unit that contains resistor elements. A selective drive with pre-heating of the resistor elements serves the purpose of reducing the heating capacity during printing. For driving a printer head, energy for the individual pixels of the print format is offered in defined fashion and a print format is printed on a recording medium that is to be printed and which is moved relative to the inking ribbon. The inking ribbon transfers the inking particles from the inking layer onto the recording medium when a particular heating resistor in the printer head is heated.

Ink jet printers are also suitable for franking postal matter. In conformity with the printing principle employed, the circuit arrangement must be matched to the required actuators and sensors.

European Application 465 236 discloses an ASIC that includes a circuit for print control, a circuit for motor control and a circuit for accounting purposes. The circuit for print control has a memory for fixed data and another memory for variable data that are superimposed with the fixed data. A motor controller is provided for actuation of the motor drive dependent on the delivery of postal matter. A sensor supplying tacho-signals is in communication with the printer controller via the motor controller. An advantage obtained by this approach is that high security against manipulation results from the limited number of points of attack for a manipulation due to the employment of a single ASIC. A disadvantage of employing a single ASIC is that it cannot be used in different postage meter machines that have a different printer control module and thus it cannot be used in existing postage meter machine systems wherein the design is already established.

If it is nonetheless desired to use an ASIC in different types of postage meter machine then a plurality of circuits (ASICs or/and other components) must be provided. The plurality of components and circuits offers ingress opportunities for a manipulation if no further security measures are made and a security housing is not used. The postage meter machine types differ in form and equipment corresponding to the volume of mail to be processed, and thus also differ with respect to the number of sensors and actuators which they contain.

European Application 231 452 discloses periodic interrogation of sensors corresponding to a software routine of a central processing unit (CPU), preferably a microprocessor.

A disadvantage of this approach is the high calculating time caused by the periodic sampling of the sensors. This disadvantage is aggravated if an especially time-critical interrogation is necessary. In order to be able to react optimally quickly to a change in status, the interrogation frequency must be set high. The microprocessor thus spends a large part of its calculating time on the interrogation.

U.S. Pat. No. 5,267,172 discloses a serial interface in a postage meter machine that is arranged between a microprocessor and an ASIC, via which address, command and data are serially transmitted to the ASIC. A disadvantage of this known interface is that time-critical interrogations cannot be realized and that there is no independent operation of the interface, the interface requiring the use of calculating time in the microprocessor.

This latter disadvantage is likewise applicable to a data processing system disclosed by U.S. Pat. No. 5,199,105. For a universal, asynchronous receiver/transmitter module, a first shift register is proposed therein for emitting the data and a second shift register is proposed for reading in the data and a programmable comparison register is proposed in order to trigger an interrupt when a specific data byte is received via the serial channel.

SUMMARY OF THE INVENTION

An object of the present invention is to provide an internal postage meter machine interface circuit that avoids the disadvantages discussed above and which can be realized in economical fashion for a number of different models of postage meter machine without reducing the reliability against manipulation.

A further object is to provide such an interface which also permits interrogation of the sensors by the control means of the postage meter machine or the control of the actuators to be conducted economically and with less calculating time of the CPU being occupied by the interface.

A further object is to provide a print data controller with which less calculating time of the CPU is occupied and which nonetheless preserves the necessary functioning or manipulation dependability.

The invention is based on the consideration of improving the adaptability of the electronic controller to various postage meter machine models on the basis of an internal postage meter machine interface circuit.

Inside a security housing, a microprocessor, in a first circuit part in which only security-associated data are processed, is connected to an inventive, second circuit part in which the other data for the particular type of postage meter machine are handled. This second circuit part forms an internal postage meter machine interface to the first circuit part.

Preferably, the internal postage meter machine interface circuit is implemented as a system-specific ASIC.

It is assumed that the microprocessor of the first circuit part accesses the second circuit part for driving an electronic printer head and the actuators, or for conducting sensor interrogation. Non-periodic data are thereby interrogated by the microprocessor or are communicated thereto.

The circuit part for security-associated data is fashioned the same for all postage meter machine models. The second circuit part (ASIC) for the remaining data is fashioned as an internal interface to the first circuit part in conformity with the postage meter machine model.

The second circuit part (ASIC), i.e. the internal postage meter machine interface circuit, is equipped with transmission and reception registers for storing data transmitted in parallel and with a shift register for serial/parallel or parallel/serial conversion of transmitted data within an actuator/sensor controller in the meter. The second circuit part (ASIC) also has two lines at its output, particularly a transmission line and a reception line, to the base of the postage meter machine with which data are serially communicated between the meter and a register unit in the base within the postage meter machine. Sensors and actuators of the base are connected to the register unit. Sensor signals are shifted in the shift register of the actuator/sensor control and are present therein in a manner which permits the signals to be fetchable in parallel. A sensor status register group for parallel data of the sensor signals of at least one sensor is provided as a reception register. At least one sensor status register and at least one interrupt control register are connected to a watchdog circuit in order to monitor the received bits of the sensor signals for status changes, and thus to trigger an interrupt to the control unit, if necessary.

The internal postage meter machine interface circuit also has a decoder for offering the memory control signals for the actuators/sensor controller and a first automatic status unit as well as a print data controller within the actuator/sensor controller. The aforementioned decoder, the actuator/sensor controller and the print data controller respectively contain control or data registers.

Within the ASIC, the corresponding data for a sensor interrogation and for setting the actuators can be offered in a known way in parallel form in the status register or in the command register. Preferably, only serial interfaces to the base are provided, thereby enabling a system expansion for a plurality of sensors and actuators corresponding to various franking systems. As a result of a low number of lines to the base, an economical solution for a meter/base separation is achieved.

The automatic status unit realized in terms of hardware automatically samples the sensors and loads a status register and sets the actuators corresponding to the data stored in the command register.

An interrupt controller is inventively connected between the control unit (CPU) and status register, with parallel data lines from the status register to the control unit (CPU). When the status register has been loaded under hardware control, the interrupt controller interprets the individual bits. A predetermined status or status change of each individual bit is immediately communicated to the control unit (CPU) by an interrupt request.

The actuator/sensor controller has a first automatic status unit which effects that sensor signals supplied by the register unit are shifted in controlled fashion into the shift register of the actuator-sensor controller and are present therein fetchable in parallel, and which also effects that data present in parallel for the actuators are loaded parallel from command register groups into the shift register and are then serially read out for supplying the actuators in the base. The actuator/sensor controller and the watchdog circuit are connected to the control unit (CPU). The interrupt control register and the control unit (CPU) are programmed to define the type of change of the sensor value on the basis of which an interrupt request is triggered in the interrupt control register, and then to correspondingly implement an interrupt, so that the control unit (CPU) can directly branch into the corresponding sensor handling routine.

The advantage of such a non-periodic interrogation or communication of data of the interrupt controller connected to the control unit (CPU) is that calculating time on the part of the control unit (CPU) can be saved. A further advantage is that the control unit (CPU) no longer must be informed as to what sensor has changed in value. The information about the sensor is communicated to the control unit (CPU) during the interrupt processing, so that it can directly branch into the corresponding sensor handling routine. The type of change of the sensor value on the basis whereof an interrupt request is triggered can be preset, so that the type of sensor change is also inherently known by the interrupt request in addition to identifying the sensor, without having to interrogate the sensor value in the status register.

An interrupt control register preferably precedes the interrupt controller in order to influence the type of interrupt triggering. The change of the value of a sensor line can thus generate an interrupt at the processor. Moreover, no synchronization when setting the actuators is required on the part of the control unit (CPU) with respect to the serial transmission between meter and base.

For creating a print data controller the internal postage meter machine interface circuit is equipped with transmission and reception registers for storing data transmitted parallel and with a shift register for serial/parallel or parallel/serial conversion of the data transmitted from or to the printer head via a printing register.

The print data controller is inventively expanded to form a security module and, in addition to offering the desired compatibility with the control unit (CPU), offers higher manipulation dependability against fraudulent use of the printer head in conjunction with specific printer head electronics. Inventively, a code is generated independently in a respective code generator of one unit, i.e. in the printer head electronics and in the security module, and is transmitted to the other unit. Comparators check the received enablement or acknowledgement code against the anticipated code. Given a match, the printer head is enabled for an individual print format. The image to be printed is then transmitted in "plain text" (unencoded). After the end of the data transmission, the printer head is automatically inhibited again and must be enabled with the assistance of a further, coded data exchange. A new, coded data set for enablement or acknowledgement is generated for each print format so that a registration of the enable event cannot be reemployed.

In a further version the print data controller includes a third automatic status unit that has an input side connected to a mode register group for setting the operating mode and an output side connected to control inputs of the transmission shift register. This third automatic status unit also includes a test circuit and a print register in order to insert a second acknowledgement code emitted by a first, connectable code generator into a test shift register under the control of the third automatic status unit. The second acknowledgement code is present in the test shift register so as to be fetchable in parallel. The test circuit is fashioned according to a security printer mode that has been set to monitor the serial data transfer between the print register/printer head electronics and the transmission shift register in order to monitor the received bits for a predetermined status change. For triggering an interrupt to the control unit as necessary in order, in turn, to trigger a transmission of printing data to the printer head.

DESCRIPTION OF THE DRAWINGS

FIG. 2 is a block circuit diagram of an internal postage meter machine interface circuit constructed in accordance with the principles of the present invention.

FIG. 3 is a block circuit diagram of an actuator/sensor controller constructed in accordance with the principles of the present invention.

DESCRIPTION OF THE PREFERRED EMBODIMENTS

Figure 1:
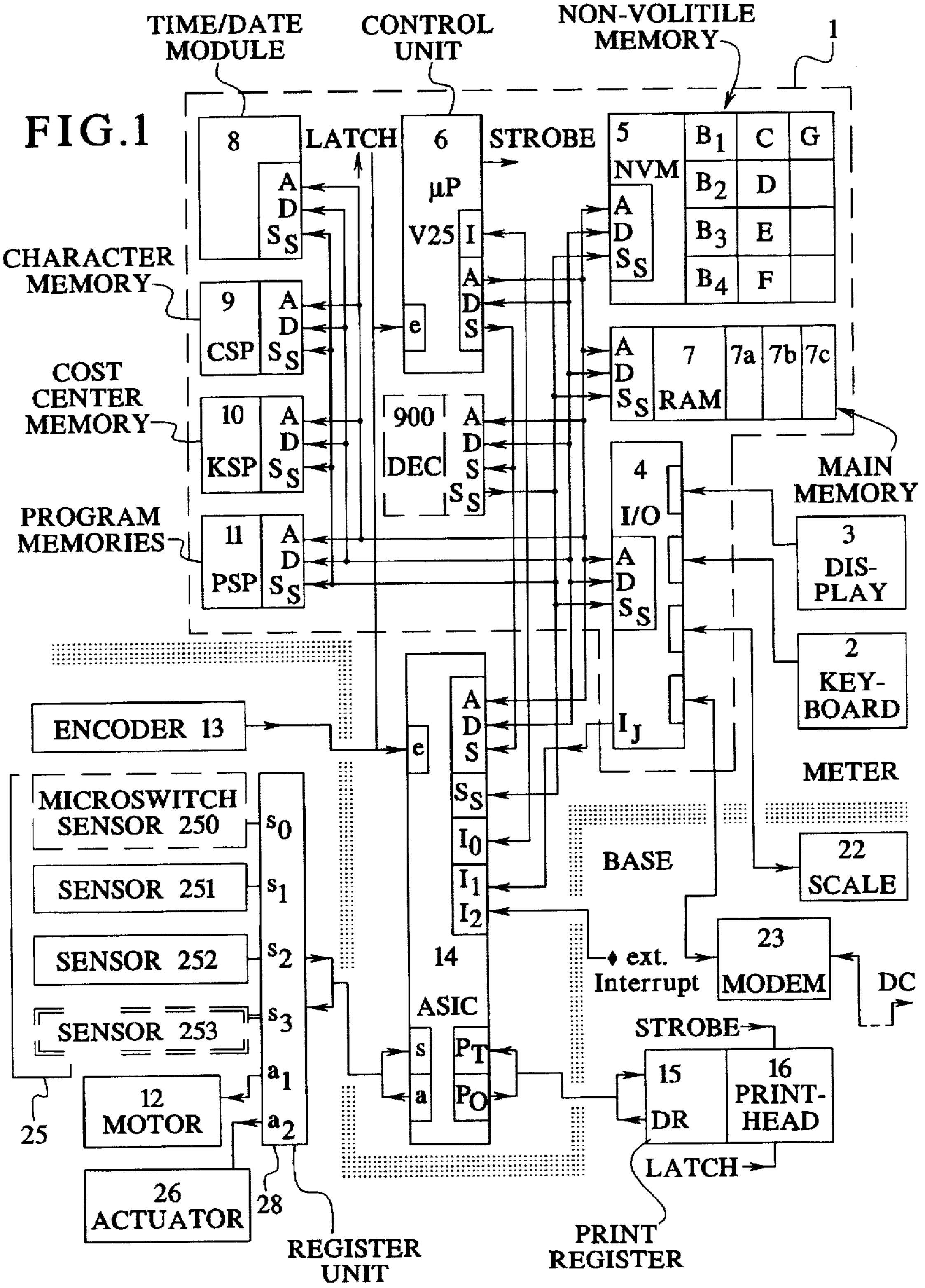
FIG. 1 is a block circuit diagram of the circuit arrangement for meter and base constructed in accordance with the principles of the present invention.

FIG. 1 shows a block circuit diagram of a circuit arrangement for a postage meter machine. The circuit arrangement can be allocated to two parts, namely meter and base, whereby the base contains at least the motors and other actuators, sensors as well as the printer head in addition to associated control electronics. As a first circuit part, the meter contains the actual controller that is connected to an input/output module 4 and, in particular, to a second circuit part, which is the inventive internal postage meter machine interface circuit that can be advantageously fashioned as ASIC 14. In a known way, the controller includes a time/date module 8, a character memory 9, a cost canter memory 10, a non-volatile memory 5, program memories 11 and main memories 7 that are in communication with a microprocessor 6.

Time data and the date are generated automatically in the time/date module 8 even with the postage meter machine deactivated. The input/output module 4, for example via an RS-232 interface, produces a connection to the modem 23 and, if used, to a scale 22. These can be components of the base. A display controller 3 and a keyboard 2 are also connected to the input/output module 4.

The input data are stored in the non-volatile memory (NVM) 5 such that the last setting before the postage meter machine is turned off is preserved. The operating program and fixed data, for example for an advertising slogan, are stored in the program memory 11. The current accounting data are stored non-volatilely in the cost center memory 10 before every imprint.

A character set is stored in the character memory 9. According to the inputs, corresponding characters are stored as pixel data in the pixel memory 7.

The microprocessor 6 is utilized as the control unit for the entire postage meter machine and is connected via address lines A and data lines D to the components of the first circuit part and is connected via address, data and control lines (A, D, S) to the second circuit part 14 that is fashioned as an ASIC. Corresponding to the memory control signals $S_s$ generated in the decoder of the ASIC 14, the aforementioned components are addressed by the microprocessor 6.

The function-defining blocks—shown in FIG. 1—of the first circuit part can thereby be partially or totally combined to form at least one unitary component and further measures can be provided in order to make a manipulation by unauthorized persons more difficult. The functions of these components and such measures are set forth in greater detail, for example, in German Application P 43 44 476.8 corresponding to copending U.S. application Ser. No. 08/346,909, assigned to the same assignee (Francotyp-Postalia) as the present application and entitled "Method for Improving the Security of Postage Meter Machines" (Windel et al.), filed Nov. 30, 1994, the teachings of which are incorporated here in by reference.

The invention is set forth in greater detail in the following exemplary embodiment of FIGS. 2–5.

The circuit part 14—shown in greater detail in FIG. 2—for the internal postage meter machine interface, which is fashioned in conformity with the particular postage meter machine model in which it is to be employed, has a decoder 300 for offering the memory control signals, an actuator/sensor controller 400, an interrupt controller 600 and printing data controller 700. Address lines A0 through A3 and data lines D as well as control lines S are connected to each of these units. Address lines A13 through A19 are also connected to the decoder 300. The decoder 300 makes memory control signals $S_s$ available for the controllers 400, 600 and 700. The actuator/sensor controller 400 emits a signal $I_r$ at its output to the interrupt controller 600. The output side of the interrupt controller 600 is in communication with the control unit (microprocessor) 6 (FIG. 1) via the lines for the data and control signals $I_o$. The ASIC circuit part 14 is equipped with an input s for connection to the sensors of the base and with an output a for connection to the actuators of the base of the postage meter machine via a register unit 28 (FIG. 1).

Monitoring of the sensors and switching or setting of the actuators is assisted by the operation of the actuator/sensor controller 400 shown in FIG. 3. In order to relieve the control unit 6, the read-in of the sensor statuses and the emission of control bits for the actuators is automated by a first automatic status unit 401. The automatic status unit 401 contains register groups 410 through 450 comprising registers for communication with the control unit (CPU) 6 and registers for the automatic status unit 401.

The entire actuator/sensor controller 400 is composed of a first automatic status unit 401, two 8-bit command register groups 420 and 421, two 8-bit (sensor) status register groups 410 and 411, a shift register 430 for serial transmission of the actuator or sensor data, a mode register group 440 for setting the operating mode, and an interrupt control register group 450 for influencing the interrupt generation in a logic circuit 490.

Figure 4:
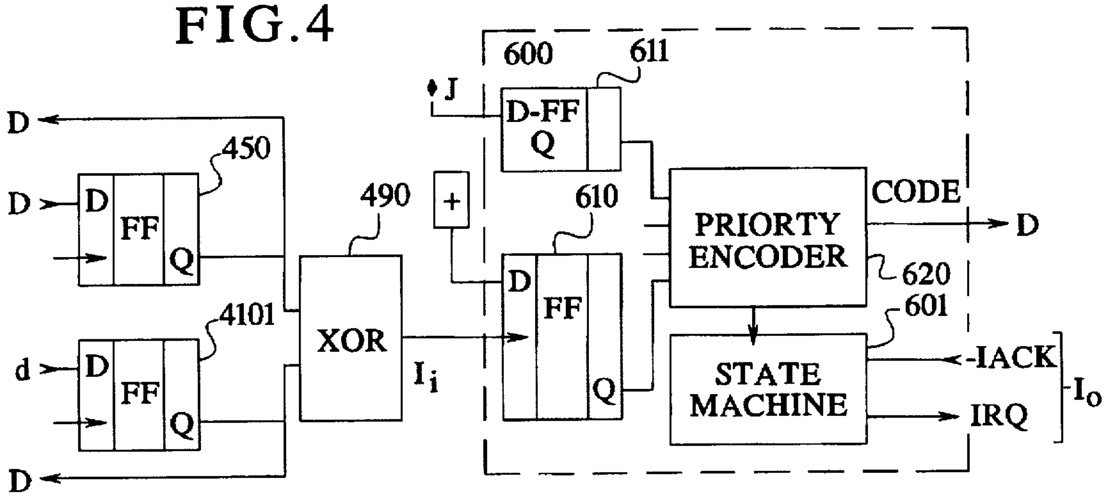
FIG. 4 illustrates a watchdog circuit with connection of the actuator-sensor controller via an interrupt controller in the internal postage meter machine interface circuit to the control unit constructed in accordance with the principles of the present invention.

The interrupt controller 600 and the logic circuit 490 form a watchdog circuit—shown in greater detail in FIG. 4—in order to send the signal $I_o$ to the control unit 6 given a status change on the connecting line. This allows an internal interrupt to be generated for the control unit 6. The logic circuit 490 of the actuator/sensor controller 400 is composed of at least an XOR gate that has a first input connected to the Q-output of a D flip-flop of the interrupt control register group 450 and has a second input connected to the Q-output of a D-flip-flop 4101 of the (sensor) status register group 410. The output of each XOR gate of the logic circuit 490 is connected to the appertaining input of the interrupt controller 600 of the internal postage meter machine interface circuit via a signal line $I_r$. This interrupt controller input is preferably a clock input of at least one D-flip-flop of a register group 610 that has its D-input connected to positive potential. The Q-output of each D flip-flop of the register group 610 is connected to an input of a priority encoder 620 which collaborates with a second automatic status unit (state machine) 601. Given an interrupt requirement identified by the priority encoder 620, the second automatic status unit 601 generates a request signal IRQ to the control unit 6 that replies with a reply signal IACK at a given time dependent on the control unit architecture. The control unit 6 can then interrogate data D from the priority encoder 620 via the data lines from which the interrupt source can be identified.

In the preferred embodiment, the interrupt generation ensues on the basis of the four least significant bits of the 8-bit (sensor) status register group 410. The logic circuit 490 is preferably in an XOR logic and, in conformity with the aforementioned exemplary embodiment, has four XOR gates that are correspondingly connected to four D-flip-flops of the register group 610. The register groups of the decoder 300, and of the controllers 400, 600 and 700 can—in a way that is not shown—form a separate unit 500 within the ASIC 14 that is in communication with the other units.

The register unit 28 in the base is equipped with a number of shift registers 281 through 286 (FIG. 1). The register unit 28—in the way shown in FIG. 3—has two sensor shift registers 281 and 282 allocated to the sensors 251 and 252 as well as two actuator shift registers 283 and 284 that are coupled with the shift register 430 of the actuator/sensor controller 400 to form a loop. The sensors 251 and 252 in the base supply data to the sensor shift registers 281 and 282.

Controlled by the first automatic status unit 401, the postage meter machine loads the value from the first command register 420 into the shift register 430.

When the data are shifted out, the data of the first sensor shift register 281 of the base are simultaneously received in the shift register 430 and the data of the second sensor shift register 282 are shifted into the first sensor shift register 281. After the conclusion of the shift procedure, the content of the shift register 430 (previous data of the sensor 251) are loaded into the first 8-bit (sensor) status register group 410. Given a corresponding setting of the interrupt control register group 450, this loading can lead to an interrupt.

The value from the second command register group 421 is now loaded into the shift register 430 and is serially transmitted. The content of the first actuator shift register 283 is thereby shifted farther into the second actuator shift register 284. At the same time, the received bits from the sensor shift register 281 (data of the sensor 252) are transmitted into the second 8-bit (sensor) status register group 411.

Subsequently, the contents of the actuator shift registers 283 and 284 are loaded into the corresponding actuator registers 285, 286 and the actuators are switched in conformity with the bit value. Simultaneously with the copying of the actuator information, the sensor shift registers 281 and 282 are newly loaded with the corresponding sensor level of the sensors 251 and 252. A run of the state machine 401 is thus ended.

In a second version, a sensor 25 is allocated to the two sensor shift registers 281 and 282, as a consequence of which the sensor signal can be evaluated with a higher resolution. Likewise, an actuator 26 can be connected via the latches 285 and 286 to both actuator shift registers 283 and 284 in order to realize a more exact setting.

In a third version, a plurality of sensors, for example a microswitch 250 for detecting the limit position during the printing event, the sensor 251, which can be a sensor for recognizing letters, the sensor 252, which can be a sensor for the tape generator . . . , etc., and similar sensors can be connected that have a coarse resolution, such as one bit, for the purpose of simulating a "true" switching function.

In a fourth version, a plurality of sensors having a low resolution or for the purpose of simulating a true switching function can be connected together with a sensor 253 with a higher resolution, thereby allowing evaluation of the sensor amplitude.

The actuators can be connected in an identical number. If a lifter magnet or a motor 12 is used requiring only one bit for triggering thereof, or if a motor operable in two directions is used requiring only two bits for triggering thereof, an actuator shift register and associated actuator register can be provided for presetting amplitude, time, frequency or data.

Likewise, thresholds for a threshold-dependent detection for a sensor can be prescribed with the actuator shift register and associated actuator register, for comparing the threshold to an actual value and communicating the comparison result bit to the sensor shift register. An amplitude can thus likewise be evaluated, but with a plurality of sensors.

In general, the aforementioned actuators include a number of actuators having low resolution and at least one actuator having high resolution, the actuators with low resolution and the actuator or actuators with high resolution being driven in common by one shift register in the register unit 28. One of the actuators having a high resolution, and the actuator register connected thereto, operate for presetting a selected quantity. At least one of the sensors can be connected to an actuator shift register in the register unit 28, the actuator register which is connected to at least one of the sensors operating to compare the sensor signal from the sensor or sensors to a predetermined threshold, and for communicating a comparison result bit to the sensor register for the sensor or sensors connected to the actuator shift register. The register unit 28 can include a component for evaluating the amplitude of the sensor signals from a number of the sensors.

In a fifth version, which is not separately shown in the figures, the actuator sensor controller 400 is connected via at least one line to the register unit 28 in the base in order either to interrogate sensor signals or actuator signals output for setting the actuators.

The encoder 13 is a sensor for time-critical data. As shown in FIG. 1, the encoder 13 is connected directly at the input e of the control unit 6 and is connected to the input e of the second circuit part (ASIC) 14. The encoder 13 acts on a DMA controller present in the control unit 6. The DMA controller reads a complete stamp format from the pixel memory (RAM) 7 and enters it print column-by-print column into the print register 15 of the printer head 16 via the ASIC printing data controller 700. The encoder 13 acts directly on the printing data controller 700 in that it supplies an external trigger signal for the transmission of the printing data for the individual printing columns to a second automatic status unit 701.

Figure 5:
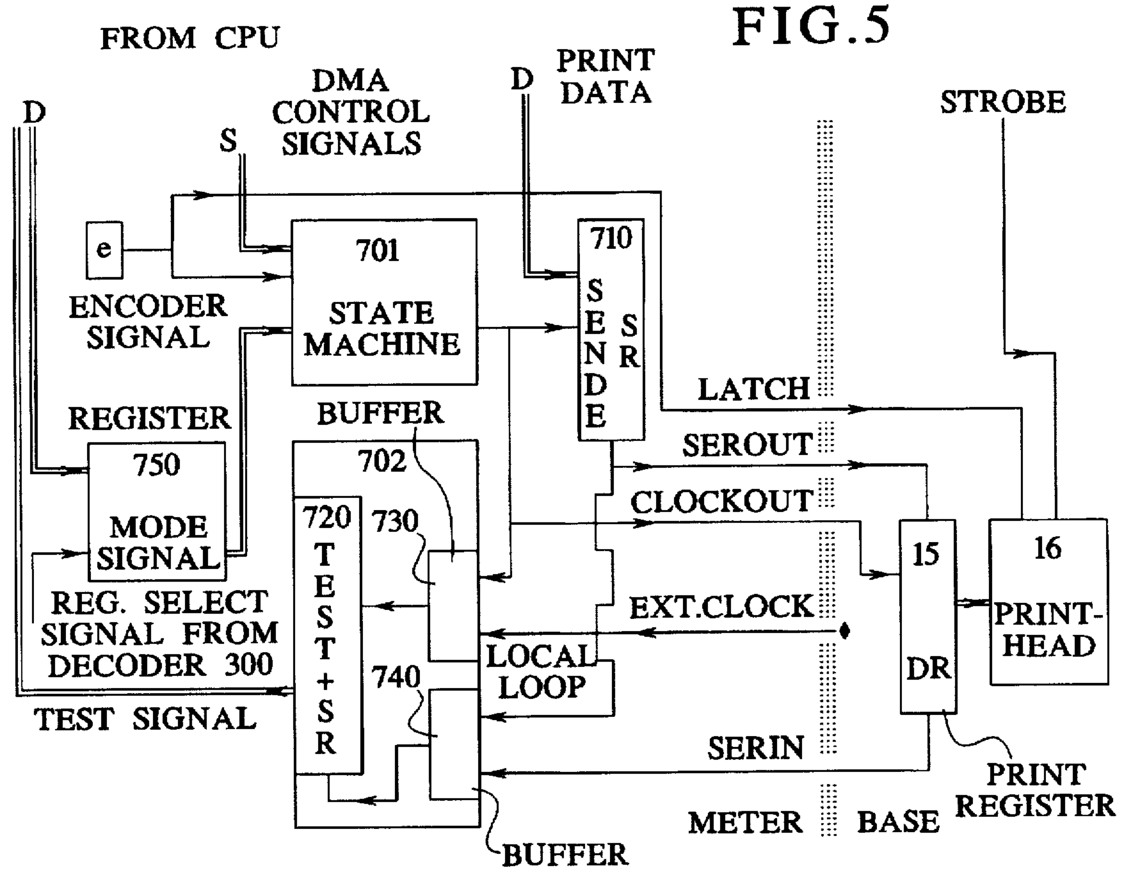
FIG. 5 is a block circuit diagram for a first version of a printing data controller with test circuit constructed in accordance with the principles of the present invention.

The print data controller 700 is shown in greater detail in a first version in FIG. 5. A third state machine 701 is connected to a transmission shift register 710 and, via a buffer 730, to a test shift register 720 in order to assume the control of the data transfer with a signal CLOCKOUT. The transmission shift register 710 transmits the bytes supplied by the DMA controller to the print register 15. A serial-to-parallel conversion of the data for the printing head electronics of the printer head 16 ensues. The printer head 16 contains registers for the intermediate storage of the parallel printing data that are controlled with a signal LATCH according to the encoder signal at the input e and also contains drivers that are controlled by a signal STROBE from the control unit 6. The drivers control the actual printer elements of the printer head 16.

The serial data transfer can be monitored in the ASIC 14 in conjunction with the first circuit part by means of a test circuit 702. The test shift register 720 can, via a buffer 740, serially receive data from the printing register 15 that, after serial-to-parallel conversion, can be read by the control unit 6 via the data line D.

The serial data transfer can also be tested in the ASIC 14 in conjunction with the first circuit part on the basis of a local loop and with the test circuit 702. The bits of the transmission shift register 710 for serial printing data are read via the buffer 740 into a test shift register 720 in the printing pauses for the purpose of testing via a local loop LOCAL LOOP and with a test circuit 702.

The operating mode can be set by specific mode registers 750 (shown in FIG. 5) by the control unit 6 via the data line D. The number of bytes, the type of transfer (with or without byte counter) and the clock rate of the shift clock can thus be predetermined.

Further registers can be provided in the register block 500 of the ASIC 14 and can, in conjunction with the third state machine 701, emit further data, clock or control signals to the printer register 15 and the printer head electronics, so that the drive also becomes possible given use of different printer heads.

Security against manipulation of a printer head arranged in the base externally of the meter achieved with the assistance of a special printer head electronics and with special circuit measures in the printing data control unit 700 that relieve the control unit 6 of print-monitoring tasks. An enable signal for an individual print format is thereby provided. Enable signals or monitoring data can alternatively be separately communicated; however, this would be more complicated than a serial communication.

Figure 6:
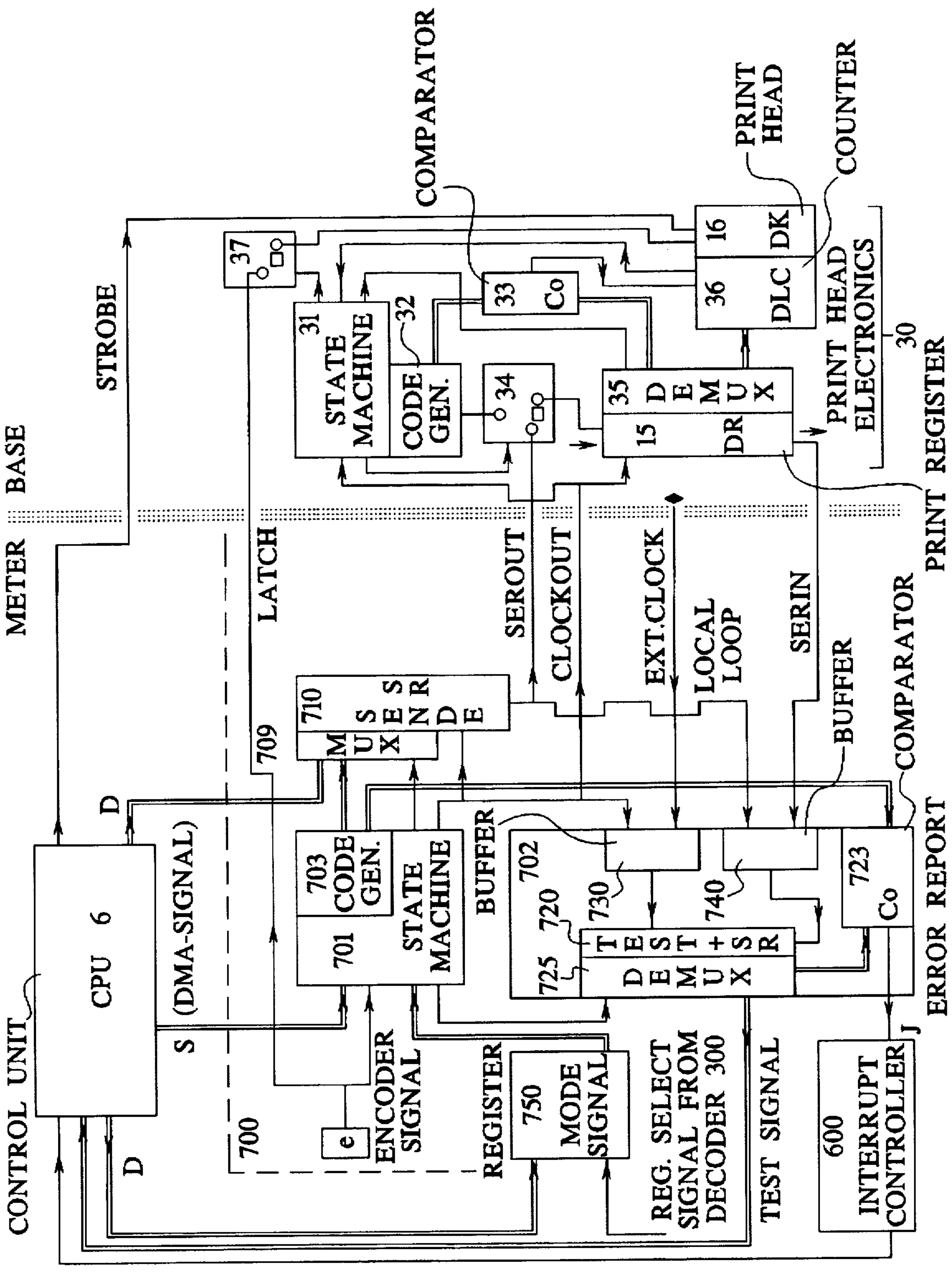
FIG. 6 is a block circuit diagram of a second version of a printing data controller with security module constructed in accordance with the principles of the present invention.

FIG. 6 shows a block circuit diagram of a second version of the inventive print data controller with a design to form a security module. The print data control unit 700 connected to an expanded printer head hardware—in the embodiment shown in FIG. 5—is expanded by a second code generator 703, a multiplexer 709, a demultiplexer 725 and a second comparator 723. In addition, the printer head hardware shown in FIG. 5 is expanded by printer head electronics 30 that includes a first code generator 32, a demultiplexer 35, a first comparator 33, a monitor module 36 for monitoring the print data length for an individual enabled print format, first and second switches 34 and 37, and a fourth state machine 31.

The modification of the expanded printer head hardware compared to the print data control unit shown in FIG. 3 arises, from an extremely large amount of print data to be communicated, for example 200 dpi (dots per inch) for a print column. The transmission shift register 710 shown in FIG. 5 or the print register 15 must also be designed for data communication for a print column. The printing ensues column-by-column, preferably on an envelope, with the print column data being pinned in parallel at the printer head and a STROBE signal being forwarded to the printer head.

The special printer head electronics 30 also satisfies a requirement for resistance to manipulation. Before the start of printing, the print data controller inventively fashioned to form a security module in the meter communicates an enable code to the special print head electronics 30 in the base. Under the control of the fourth state machine 31, the enable code intermediately stored in the print register 15 following a serial-to-parallel conversion is applied to the first comparator 33 via the demultiplexer 35. Under the control of the fourth state machine 31, the first code generator 32 generates a predetermined code and supplies it to the first comparator 33 that implements a comparison. Given a positive comparison, an enable signal is supplied to a watchdog module 36 for monitoring the print data length for an individual enabled print format. Otherwise, the printer head remains inhibited. Simultaneously with the aforementioned enablement, the predetermined code is supplied via first switch 34 to the print register 15 that serially communicates the predetermined code to the print data control unit 700 as enable code. Field effect transistors or other comparable, controllable electronic switches are preferably suitable as the first switch 34.

Inventively, such a version of a print data controller 700 has a third state machine 701 that has an input side connected to a mode register group 750 for setting the operating mode, and an output side connected to control inputs of the transmission shift register 710, via the buffer 730, a test circuit 702, and connected as well to the external print register 15, in order to insert an acknowledgement code output via a first connectable code generator 32, via the buffer 740, into the test shift register 720 under the control of the third state machine 701. The acknowledgement code is present in the test shift register 720 so as to be fetchable in parallel and the test circuit 702 is fashioned corresponding to a security printer mode that has been set in order to monitor the serial data transfer between the print register 15/printer head electronics 30 and the transfer shift register 710 to monitor the received bits for predetermined status change. A watchdog circuit is formed by the second comparator 720 and by the interrupt controller 600. A second input of a priority encoder 620 shown in FIG. 4 is supplied with the signal T emitted at the output side by the second comparator 723 via a second D-flip-flop 611, the signal T identifying a coincidence. Given coincidence, an interrupt is generated by the interrupt controller 600.

An interrupt can thus be transmitted to the control unit 6 as warranted in order to thus subsequently trigger a print data transmission to the printer head. If the transmission is started via the DMA channel, this automatically sequences without the collaboration of the control unit 6 (CPU). The control unit 6 (CPU) is thereby relieved.

The internal postage meter machine interface circuit is equipped with transmission and reception registers for storing data transmitted parallel and with a shift register for serial-to-parallel or parallel-to-serial conversion of the data transmitted from or to the printer head via a print register.

Inventively, another version of such a print data controller 700 with fashioning to form a security module has a second code generator 703 for generating two unique enable codes for each imprint and a third state machine 701 that has an input side connected to a mode register group 750 for setting the operating mode and an output side connected to control inputs of the transmission shift register 710. In this version, the printer data controller 700 also includes a test circuit 702 and the external print register 15 in order to insert a second acknowledgement code emitted by a first connectable code generator 32 into a test shift register 702 under the control of the third state machine 701. The second acknowledgement code is present so as to be fetchable parallel in the test shift register 720 and the test circuit 702 is fashioned corresponding to a security printer mode that has been set in order to monitor the serial data transfer between print register 15/printer head electronics 30 and the transmission shift register 710 in order to monitor the received bits for predetermined status change. An interrupt can thus be transmitted as warranted to the control unit 6 in order to subsequently trigger a print data transmission to the printer head. When the transmission via the DMA channel is started, this sequence occurs automatically without the collaboration of the control unit 6 (CPU). The control unit 6 (CPU) is thereby relieved.

In general, the mode register 750 supplies a signal to the state machine 701 for setting a number of bytes, a type of transfer, and a clock rate for a shift clock in the transmission register 710 and in the print register 15, the print register 15 serving as a reception register.

In the print data control unit 700, which relieves the control unit 6 of print monitoring jobs, a first input of a digital comparator 723 is connected to the parallel output of the test shift register 720 and a second input of the digital code comparator 723 is connected to the parallel output of a second code generator 703 for checking the second acknowledgement code. The data bits of the second acknowledgement code that can be fetched in parallel, are compared to the data bits of a first enablement code supplied by the first code generator 703 and, given non-coincidence, an error message is communicated to the interrupt controller 600, which thus forms a watchdog circuit with the comparator 723. Preferably, the inputs of the digital comparator (723) are provided with internal buffer memories for intermediate storage before a check of the code. An XOR operation is again internally utilized.

The control unit 6 is connected via a DMA channel to the transmission shift register 710. Given coincidence of the aforementioned code signals that are present at the inputs of the second comparator 723, the communication of the error message to the interrupt controller 600 is interrupted and coincidence is signal instead. For reporting the coincidence, a signal J is communicated to the interrupt controller 600. An interrupt is then generated by the interrupt controller 600 and is supplied to the control unit 6, as a result of which the communication of print data to the transmission shift register 710 from the control unit 6 via the DMA channel is initiated.

A multiplexer (MUX) 709 is connected between the transmission shift register 710 and each of the second code generator 703, or the control unit 6 in order to load the second enablement code or the print data communicated via the DMA channel into the transmission shift register 710.

Enablement of an individual print format is achieved with the special printer head electronics 30 and with special circuit measures, in that the printer head electronics 30 is arranged between print register 15 and the printer head 16 and, after the enablement signal, the transmission of print data to the print register 15 ensues via the printer head electronics 30 to the printer head 16, monitored by the printer head electronics 30.

The printer head electronics 30 has a fourth state machine 31 that has an input side supplied with a clock signal CLOCKOUT by the third state machine 701 and supplied with an output signal from a watchdog module 36. The output side of the fourth state machine 31 is connected to a control input of a first electronic switch 34, a control input of a second electronic switch 37, a first code generator 32, and a control input of a demultiplexer (DEMUX) 35. An internal buffer memory of the printer head 16 is connected to a first output of the demultiplexer 35 for parallel data transfer.

A first input of a digital comparator 33 is connected to the parallel output of the first code generator 32 and a second input of the digital comparator 33 is connected to the second output of the demultiplexer 35 for checking the enablement code, whereby the data bits of the second enablement code that can be fetched in parallel are compared to the data bits of a first acknowledgement code supplied by the first code generator 32 and, given non-coincidence, an error message is communicated to the watchdog module 36. The watchdog module 36 is otherwise enabled (i.e., given coincidence), by means of a signal from the fourth state machine 31 to the demultiplexer 35 which causes the parallel output of the demultiplexer 35 to be supplied to an internal buffer memory of the watchdog module 36.

The watchdog module 36 preferably includes counters in order to implement a monitoring of print length column-by-column, or byte-by-byte. The counter of the watchdog module 36 generates an output signal to the fourth state machine 31 when a predetermined print length has been reached.

The fourth state machine 31 emits a signal to the control input of the second electronic switch 37 in order, when a predetermined print length is reached, to disconnect a signal LATCH supplied by the encoder 13 from the internal buffer memory of the printer head 16, so that no further print data can be printed by the printer head 16.

Also, the fourth state machine 31 supplies a signal to the control input of the first electronic switch 34 to cause the first code generator 32 to read a second acknowledgement code into the print register that is communicated to the print data controller 700. Preferably, the inputs of the digital comparator 33 are provided with internal buffer memories for intermediate storage before a check of the code.

Since this internal postage meter machine interface circuit to the base forms a plurality of serial interfaces having arbitrary possibilities of expansion, this enables an adaptation to a large variety of different franking systems and to the base of every postage meter machine, for the purpose of interrogating sensors and for setting actuators with a non-periodic interrogation by a microprocessor 6 and with an interrupt controller 600, as well as for a print data control by the controller 700 with possibilities of operating mode setting and testing.

The various systems require differently implemented decoders 300, and thus various ASICs. A relative system independence, however, can be achieved by employment of an auxiliary decoder 900 shown with broken lines in FIG. 1, i.e. when the internal decoder 300 is only partially used or not used at all in order to drive the components of the first circuit part for security-associated data with memory control signals $S_s$.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a postage meter machine containing a plurality of sensors which respectively generate sensor signals respectively identifying a status of different postage meter machine components, said postage meter machine components being connected to and controlled by a control unit, the improvement of an internal interface circuit connectable between said sensors and said control unit comprising:

an actuator/sensor controller containing a transmission register for transmitting data in parallel, a reception register for storing said data, a shift register connected between said transmission and reception register for serial-to-parallel and parallel-to-serial conversion of said data, said shift register having control inputs, a mode register group, and a first state machine having an input side connected to said mode register group for setting an operating mode and having an output side connected to said control inputs of said shift register;

an external register unit connected to said output side of said first state machine for loading said sensor signals from at least some of said sensors into said shift register for shifting therein controlled by said first state machine;

a sensor status register group for at least one of said sensors connected to said shift register with sensor signals from said sensor status register group being fetchable in parallel;

an interrupt control register having an input; and watchdog circuit means connected to an input of at least one sensor status register in said sensor status register group and to said input of said interrupt control register for monitoring said sensor signals for a status change and connected to said control unit for triggering an interrupt of said control unit as warranted.

2. The improvement of claim 1 wherein said watchdog circuit means comprises an XOR logic circuit.

3. The improvement of claim 1 wherein said actuator/sensor controller is connected to said control unit and wherein said interrupt control register and said control unit comprise programmable means for presetting a defined change in a sensor signal which will cause an interrupt to be triggered.

4. The improvement of claim 1 wherein each sensor signal comprises a plurality of bits and wherein said watchdog circuit means comprises means for logically monitoring less-significant bits of said sensor signals for said status change for triggering said interrupt of said control unit.

5. The improvement of claim 1 wherein said external register unit comprises a plurality of sensor shift registers each having a coarse resolution which is approximately equal.

6. The improvement of claim 1 wherein said sensors include a plurality of sensors with low resolution and at least one sensor with higher resolution, and wherein said external register unit is connected to all of said sensors for evaluating an amplitude of a measured quantity from said sensors.

7. The improvement of claim 1 wherein said register unit comprises means for evaluating an amplitude of sensor signals from a plurality of said sensors.

8. The improvement of claim 1 wherein said watchdog circuit means includes an interrupt controller and a logic circuit connected to said interrupt controller, said interrupt controller comprising a second state machine driven by a priority encoder for emitting an interrupt request signal.

9. The improvement of claim 8 wherein said external register unit, for at least one of said sensors, contains two sensor shift registers both connected to said one of said sensors for monitoring the sensor signal from said one of said sensors with a higher resolution over a plurality of bits larger than said less-significant bits.

10. The improvement of claim 1 wherein said postage meter machine has a base in which said external register unit is disposed, said shift register having lines leading to said external register unit in said base for communicating serial data between said postage meter machine and said external register unit, the improvement further comprising a plurality of actuators connected to said external register unit, a plurality of command register groups connected to said shift register in the actuator/sensor controller for loading data in parallel for respective actuators from the command register groups into the shift register, said data for the actuators being serially read from said shift register to respective actuators in said base controlled by said first state machine, said register unit including a plurality of actuator shift registers for serial-to-serial conversion, said sensor shift registers conducting parallel-to-serial conversion, and said external register unit in said base comprising a plurality of further shift registers coupled to said shift register of said actuator/sensor controller for forming a loop therewith.

11. The improvement of claim 10 wherein at least one of said actuators is connected to two of said actuator shift registers in said external register unit.

12. The improvement of claim 10 wherein at least one of said sensors is connected to an actuator shift register in said external register unit, said actuator register connected to said sensor comprising means for comparing the sensor signal from said sensor to a predetermined threshold and communicating a comparison result bit to the sensor shift register for the sensor connected to the actuator shift register.

13. The improvement of claim 10 wherein said actuators include a plurality of actuators having low resolution and at least one actuator having high resolution, said actuators with low resolution and said at least one actuator with high resolution being driven in common by one actuator shift register in said external register unit.

14. The improvement of claim 13 wherein said one of said actuators having a high resolution and the actuator register connected thereto comprise, in combination, means for presetting a selected quantity.

15. An internal postage meter machine interface circuit comprising transmission and reception registers for storing data transmitted in parallel and a shift register for the parallel-to-serial conversion of the transmitted data, a state machine in a print data controller having an input side supplied with an encoder signal and with DMA control signals and a signal from a mode register identifying a predetermined operating mode for said print data controller, the state machine controlling the shift register, and a test circuit controlled by said state machine for, in cooperation with a control unit, setting an operating mode of the print data controller, said test circuit comprising means for checking the operating mode of said print data controller for conformity with said predetermined operating mode.

16. An internal postage meter machine interface circuit as claimed in claim 15 wherein said mode register supplies a signal to said test circuit for conducting a test for conformity of said operating mode of said print data controller with said predetermined operating mode by reading bits from said transmission register and for reading serial print data into a test shift register of said test circuit via a local loop with a serial-to-parallel conversion, and said control unit comprising means for conducting said testing exclusively in a first circuit part during printing pauses.

17. An internal postage meter machine interface circuit as claimed in claim 15 wherein said mode register comprises means for supplying a signal to said state machine setting a plurality of bytes, a type of transfer, and a clock rate of a shift clock for said transmission and reception registers.

18. An internal postage meter machine interface circuit comprising transmission and reception registers for storing data transmitted in parallel and a shift register for serial-to-parallel and parallel-to-serial conversion of the transmitted data, a print data controller having a state machine having an input side connected to a mode register group for setting an operating mode of said print data controller and having an output side connected to control inputs of the transmission shift register, a test circuit and a print register for inserting an acknowledgement code emitted by a code generator into a test shift register in said test circuit controlled by said state machine, said acknowledgement code being stored in said test shift register so as to be fetchable in parallel, and said test circuit being operable in a security printer mode for monitoring serial data transfer between said print register and printer head electronics, and the transmission shift register, and a watchdog circuit means for monitoring the received bits for a predetermined status change for, if necessary, triggering an interrupt to the control unit and a print data command to the printer head.

19. An internal postage meter machine interface circuit as claimed in claim 18 further comprising a digital having a first input connected to a parallel output of said test shift register and a second input connected to a parallel output of a further code generator which generates an enable code, data bits of the acknowledgement code being fetched in parallel by said digital comparator from said test shift register and being compared to data bits of said enable code supplied by said second code generator, and said digital comparator generating a signal indicating coincidence to an interrupt controller.

20. An internal postage meter machine interface circuit as claimed in claim 18 wherein said control unit is connected to said transmission shift register via a DMA channel and, upon an interrupt signal being supplied to said control unit, initiating communication of said print data to said transmission shift register from said control unit via said DMA channel.

21. An internal postage meter machine interface circuit as claimed in claim 18 wherein said printer head electronics is connected between said print register and a printer head, for transmitting said print data to said print register via the printer head electronics while being monitored by said printer head electronics.

22. An internal postage meter machine interface circuit as claimed in claim 18, wherein the printer head electronics comprises a further state machine having an input side supplied with a clock signal by the state machine and with an output signal from a watchdog module, and having an output side connected to a control input of a first electronic switch, to a control input of a second electronic switch, to a first code generator and to a control input of a demultiplexer, an internal buffer memory of a printer head being connected to a first output of the demultiplexer for parallel data transfer;

digital comparator having a first input connected to a parallel output of the first code generator and having a second input connected to a second output of the demultiplexer for checking an enable code, data bits of the enable code being fetchable in parallel and compared in said digital comparator to the data bits of an acknowledgement code supplied by the first code generator and, given non-coincidence, an error message is communicated to the watchdog module; the watchdog module, being otherwise enabled and the demultiplexer being switched by the state machine for parallel data transmission to an internal buffer memory of the watchdog module via a first output of the multiplexer;

the watchdog module comprising a counter for monitoring print length.

23. An internal postage meter machine interface circuit as claimed in claim 22, wherein the counter generates an output signal to the further state machine when a predetermined print length has been reached; whereupon the fourth state machine supplies a signal to the control input of the second electronic switch for, when a predetermined print length has been reached, disconnecting a latch signal supplied by the encoder from the internal buffer memory of the printer head, so that no further print data can be printed by the printer head and wherein the further state machine supplies a signal to the control input of the first electronic switch and a second acknowledgement code is read by the first code generator into the print register, also being communicated to the print data controller.

24. An internal postage meter machine interface circuit as claimed in claim 23 comprising a multiplexer connected between the transmission shift register and the second code generator for loading the enable code and the print data communicated via the DMA channel into the transmission shift register; and wherein that the inputs of said digital comparator have internal buffer memories for intermediate storage before a check of the code.

* * * * *